United States Patent [19]
Koning et al.

[11] Patent Number: 6,125,112
[45] Date of Patent: Sep. 26, 2000

[54] NON-BUFFERED, NON-BLOCKING MULTISTAGE ATM SWITCH

[75] Inventors: G. Paul Koning, Wilton, N.H.; Brian Ramelson, Brighton, Mass.

[73] Assignee: 3Com Corporation, Santa Clara, Calif.

[21] Appl. No.: 09/046,230

[22] Filed: Mar. 23, 1998

[51] Int. Cl.[7] .............................. H04L 12/50; H04L 12/56
[52] U.S. Cl. ............................................ 370/388; 370/395
[58] Field of Search ................................. 370/388, 392, 370/394, 395, 396, 412, 416, 411, 413, 415, 380, 383, 386, 410

[56] References Cited

U.S. PATENT DOCUMENTS

| | | | |
|---|---|---|---|
| 4,837,855 | 6/1989 | Hajikano et al. | 370/388 |
| 5,177,736 | 1/1993 | Tanabe et al. | 370/388 |
| 5,179,551 | 1/1993 | Turner | 370/388 |
| 5,276,425 | 1/1994 | Swanson et al. | 370/388 |
| 5,631,902 | 5/1997 | Yoshifuji | 370/388 |
| 5,648,957 | 7/1997 | Lee et al. | 370/388 |
| 5,768,270 | 6/1998 | Ha-Duong | 370/388 |
| 5,940,389 | 8/1999 | Yang et al. | 370/388 |

*Primary Examiner*—Chau Nguyen
*Assistant Examiner*—Soon-Dong Hyun
*Attorney, Agent, or Firm*—McGlew & Tuttle, P.C.

[57] ABSTRACT

A multistage ATM switch, method and system with switch elements with two input/outputs switchable to two other input/outputs. The switch elements are arranged connected to define a matrix with an input stage an output stage and at least one an intermediate stage. The multi stage switch inputs are presented with address information for data, the address information indicates requests for one of several outputs of said the multi stage switch. The requests are broadcast into the multi stage switch. At each stage the requests are remembered, merged and propagated to connected switching elements of a next stage. At each output of the multi stage switch grants a request if traffic can be accepted and propagates the requested grant to connected switching elements. At each switching element, upon receiving a request grant, the request grant is propagated to an input that requested the granted output port. If both inputs requested the granted port the switch element randomly chooses one of the two inputs and propagates the grant on the randomly chosen input. Upon receiving a request grant at an input of the multi stage switch, data is transmitted on a next time slot.

16 Claims, 9 Drawing Sheets

NON-BUFFERED, NON-BLOCKING MULTISTAGE ATM SWITCH

FIELD OF THE INVENTION

The invention relates to the field of Asynchronous Transfer Mode (ATM) communications and more particularly to switches for ATM applications.

BACKGROUND OF THE INVENTION

Asynchronous Transfer Mode (ATM) has been increasingly used for network applications, particularly as interconnected networks grow to a large size. ATM is based on cells of pre-defined length wherein the cells are forwarded from one user or network to another user or network via switches. By directing cells from a source to only an address or addresses of interest, advantages are obtained with regard to overall communication traffic. However, the use of ATM has resulted in the need for new hardware and software.

ATM switches are known which provide a transfer of cells from an input to one of several switch outputs. As the users or networks which are connected by the switch increase, switches of greater size are required.

It would be advantageous to be able to provide ATM switches of any switch capacity without blocking the full bandwidth of the various component switches. It would be desirable to scale bandwidth up or down.

FIG. 1 shows an ATM switch element in its basic form, namely a 2×2 switch, with two inputs each connectable to either of two outputs (the switch may also be bi-directional but one direction is discussed for explanation purposes herein). As noted above, it would be advantageous to combine such switches without blocking the full input bandwidth or blocking the full output bandwidth of the combined switches.

FIG. 2 shows 2×2 ATM switch elements which are connected together. The resulting combined switch element has the same switching ability as the switch shown in FIG. 1. A simple combination of switches does not increase the switching function.

FIG. 3 shows a combination of four switches such as the switch shown in FIG. 1. The switches are provided in a column and row formation. The first column are switches providing the input. The second column (or last column) are switches which provide the output. The rows include an upper row or first row and lower row or second row. A person of ordinary skill in the art will appreciate that physically the switches do not have to be positioned this way relative to each other as long as the connections are as shown. Nevertheless, a discussion of an input column or input segment, an output column or output segment and rows of the combined switch, facilitates explanation.

In the combined switch of FIG. 3, switches such as FIG. 1 are combined to provide four inputs $I_1$, $I_2$, $I_3$, and $I_4$ and four outputs $O_1$, $O_2$, $O_3$, and $O_4$. This appears to provide a scaling or increase in switching function. However, the combined switch of FIG. 3 is blocking because the following input to output streams will be blocking for fifty percent of the time. Specifically, $I_1 \rightarrow O_3$; $I_2 \rightarrow O_4$; $I_3 \rightarrow O_1$; $I_4 \rightarrow O_2$. This can be appreciated as in the combined switch of FIG. 3 a switch element of the top row of the input section (with inputs $I_1$ and $I_2$) only has one connection to the switch in the output section of the bottom row (with output $O_3$ and output $O_4$). If two input streams are to flow from the switch element of the input section top row to the output section bottom row, one of these streams is blocked.

Further, in providing a multistage switch a problem arises as to (a) introducing out of order cells and (b) introducing internal bottlenecks caused by static connection routing.

The standard solution for this problem involves buffered switch stages and a final step to put the cells back in order (causing substantial extra delay and cost). A further solution involves a fixed routing of connections which necessarily causes congestion at individual connections.

SUMMARY AND OBJECTS OF THE INVENTION

It is the primary object of the invention to provide a multistage ATM switch which is non-blocking and provides maximum efficiency without buffering.

According to the invention, the resulting multistage switch is part of a system for connecting input elements of the multistage switch with output ports. In order to provide the maximum efficiency in a multistage switch as described above, each input stage constructs a request (bitmap) for output ports. This bitmap is then broadcast into the switch fabric (relayed to the connected switches of the next stage). At each stage, requests are remembered, merged and propagated (further broadcast into the switch fabric, namely to the connected switches of the next stage). Output ports then issue a grant if they can accept traffic. This grant then propagates backward (is sent to the connected switches of the previous stage). At each stage, the grant is propagated to the input that requested that port. If both inputs requested it, a random choice is made. If an input is given a grant, it transmits on the next time slot (and the path of the grant is the path of data). If an input is not given a grant (path), it retries by broadcasting the request bitmap for output ports again. Several iterations of the request/grant cycle are possible for a single data cycle, resulting in a very high efficiency.

The invention may use a multistage switch including individual switch units. The individual switch units may be two by two (two input by two output) switch elements or have more inputs and outputs. The switch units may be connected to form at least a two switch element by three switch element multistage switch (or switch matrix with three stages and two rows). Other n(row) by n+1 (stage or column) multistage switches may be provided. The matrix includes a first switch element of an input stage which is connected to a first switch element of a second or intermediate stage and a last or intermediate switch element of the intermediate stage. A last switch of the input stage is connected to the last switch of the intermediate stage and a first or intermediate switch element of the intermediate stage. In each case, the switch in the first row is preferably connected to the first switch of the next subsequent stage and either the last switch of the next subsequent or an intermediate switch, depending on how big the combined switch is. Likewise, the last switch element of each stage is connected to the last switch element of the next stage and is connected to either the first switch element of the next stage or an intermediate switch element of the next stage, depending upon how big the switch element is. By connecting two by two (2×2) switch elements in stages and maintaining n+1 stages for each input row (for each two inputs of a two by two switch) it is possible to scale bandwidth up or down by combining or disconnecting ATM switches. Although two by two (2×2) switches are discussed herein, as the most basic switch element, other switch elements with different numbers of inputs and outputs, may be combined following the practices of this invention including a connection based on n+1 stages and n rows of switch elements and with at least the interconnection of the first row and last row switches as noted. Such more complex combined multistage switches may also use the system for maximizing efficiency as described herein.

Although the term matrix and the concept of columns and rows is mentioned, physically the switches may be disposed in any of various positions. For example, the switches may be stacked one above the other or arranged side by side. However, the connections between the switches provide an orientation including an input stage, intermediate stage and output stage and define the input and output stages as well as intermediate stages. Although the switches do not need to be in a row, the connections define positions of the switches within stages and this is referred to using the term row (as in column and row) for convenience.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 2:
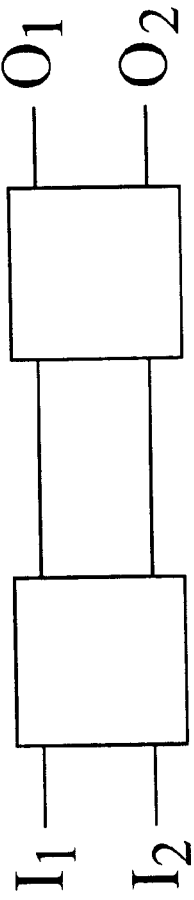
FIG. 2 is a view showing two 2×2 switch elements connected without increased switch capacity and without a gain in bandwidth.
Figure 3:
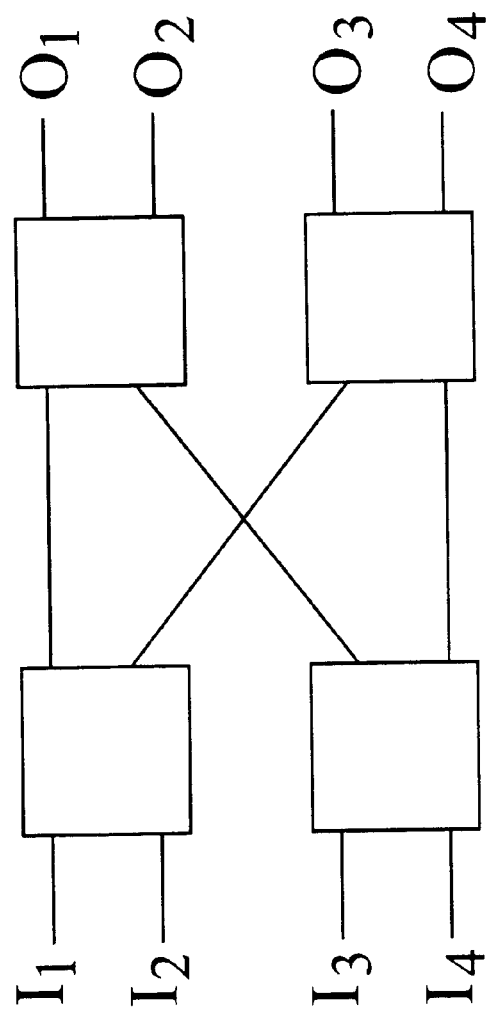
FIG. 3 is a view showing combined 2×2 switch elements interconnected to form a multistage switch which will be blocking.
Figure 1:
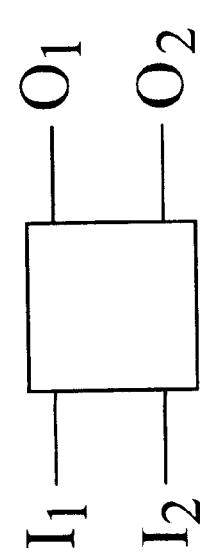
FIG. 1 shows a 2×2 ATM switch element.

Referring to FIGS. 1 through 11 in particular, the invention comprises a switching fabric generally designated 10. The switching fabric shown is made up of individual switching units however, other embodiments of a multistage switch may also be used according to the invention. In the embodiment shown in FIG. 1 the smallest switching unit is shown as a two by two ATM switch such as two by two switch 12, 22, 42, 52, 72, and 82. Each switch such as switch 12 has two input/output elements such as input output elements 14 and 16 wherein signals on these input/output elements 14 and 16 may be switched to either of the input/output elements 18 and 20 (this is what is meant by a two by two switch). The switch may be bidirectional, however for ease of explanation, operation in a single direction is discussed in detail. Two by two switches are shown as these are particularly useful as the basic unit for scaling, increasing switch capacity and bandwidth. However, the invention can be applied to other linked switching units to form an overall switching fabric such as switching fabric 10.

According to the invention, the multistage switch or switching fabric 10 is provided with a plurality of switch elements which form stages. Switch elements 12, and 22 are part of the first switching stage or input stage of the multistage switch 10. The switching elements 42, and 52 are part of an intermediate stage and the switching elements 72, and 82 are part of a output stage or final stage of the multistage switch 10. Multistage switch 10 has a first switch element 12, in a first row, and a last switch element 22 in a last row. If the multistage switch is scaled up, one or more intermediate rows of switch elements are added (along with additional stages, maintaining the n+1 stage for each n row relationship).

In a similar manner, the first switch 42 of the intermediate stage has output 48 connected to input 74 of first switch element 72 of the output stage and has a second output 50 connected to input 84 of the last element 82 of the output stage. the last switch 52 of the intermediate stage has an output 58 connected to input 76 of the first switch 72 of the output stage and has an output 60 connected to input 86 of the last switch element 82 of the output stage. In this way, four inputs 14, 16, 24 and 26 of the combined multistage switch 10 are connectable to four different outputs 78, 80, 88 and 90 in a non-blocking manner.

Figure 5:
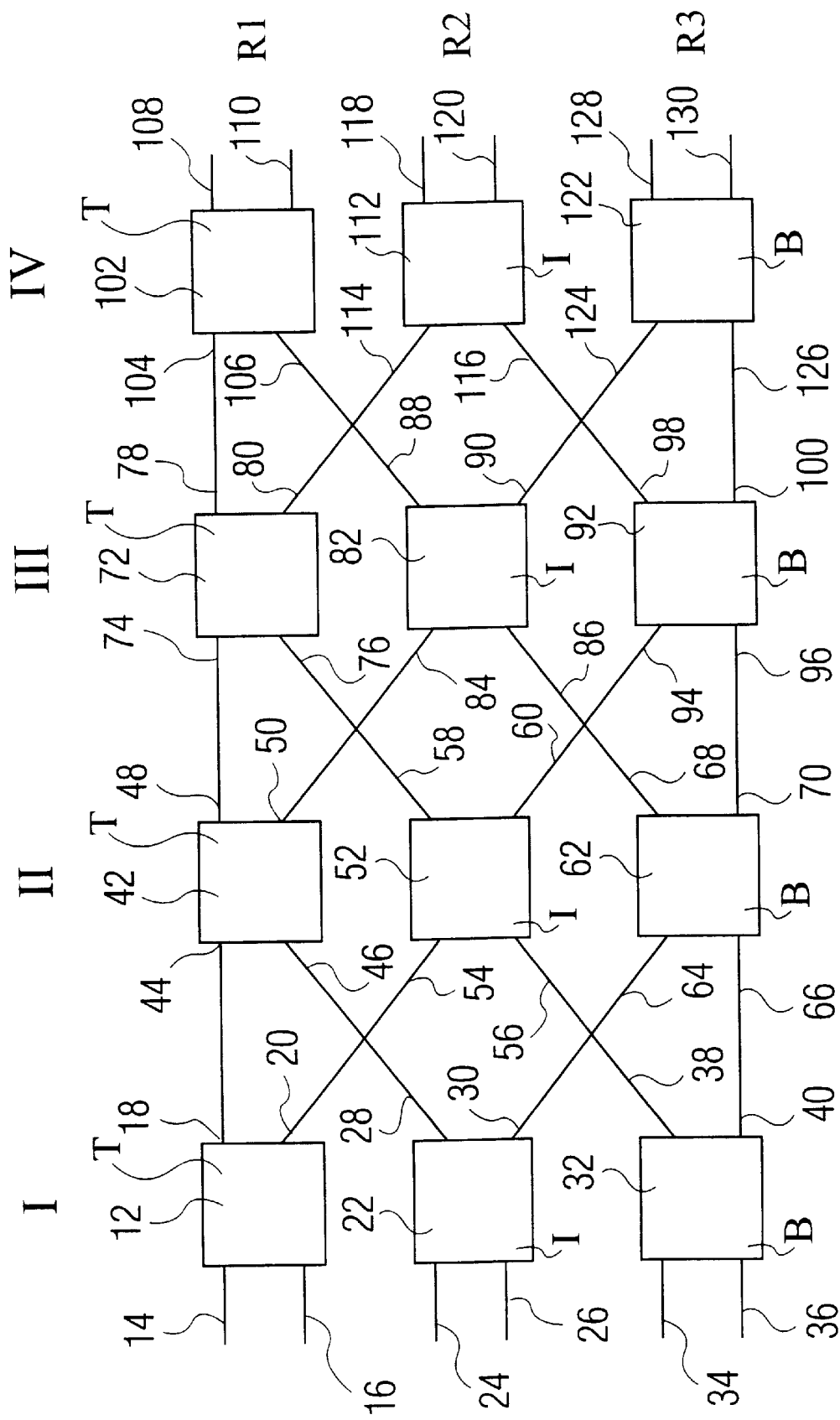
FIG. 5 is view similar to FIG. 4 showing a further expansion of the multistage switch of FIG. 4.

FIG. 5 provides an example of a multistage switch 10' with an additional stage and an additional row to provide six inputs and six outputs. The switch elements 12, 22, 42, 52, 72 and 82 are still provided. However, the switches 22, 52, and 82 are now in an intermediate row and the switch elements 72 and 82 are now in an intermediate stage. A switch element 32 is added to the input stage, a first intermediate stage switch element 62 is added, a second intermediate stage switch element 92 is added and three output stage elements 102, 112 and 122 are added.

Scalability of basic ATM switch elements may be provided by maintaining an n+1 stage to n row relationship and providing that a first input/output 18 of the first switch 12 of the input stage is connected to an input output 44 of the first switch 42 of the intermediate stage whereas a second input output 20 of the first switch 12 of the input stage is connected to an input/output 54 of the last switch 52 of the intermediate stage. In a similar way, an input/output 30 of the last switch element 22 of the input stage is connected to an input output 56 of the last switch 52 of the intermediate stage whereas another input/output 28 of the last switch unit 22 of the input stage is connected to an input/output 46 of the first switch 42 of the intermediate stage.

The first switch element 12 is again connected to first switch element 42 of the first intermediate stage. The other output 20 is connected to input 54 of switch element 52, namely a switch element of the first intermediate stage which is in a different row from first switch element 12. Last switch element 32 has the output 40 connected to input 66 of last switch element 62, of the intermediate stage. Last switch element 32 of the input stage has its other output 38 connected to switch 52 of the second intermediate stage, namely the switch of the second intermediate stage which is in a different row from that of switch 32. Subsequent first and last switch elements of the subsequent stages, are connected in a similar manner, to a switch of the same row (the first row or last row) but of the next stage, and to a switch in a different row in the next stage. Similarly, an intermediate stage has a first or upper switch unit 42 and a last switch element 52. The final stage is provided with a first switch element 72 and a last switch element 82. Additional stages and rows may be provided and additional intermediate switch elements may also be provided, to scale up the switch (provide additional switch capacity and additional bandwidth).

As to an intermediate switch such as intermediate switch 22, the input/output 28 is connected to an input/output 46 of the switch 42 which is in a row (connection position) higher than the switch 52. In a similar manner another input/output 30 of switch 22 is connected to a switch which is in the intermediate stage but which is in a row (connection position) lower than the row corresponding to switch 22. The same rules apply as to connecting the switches of intermediate rows of subsequent stages up to the output stage. The input/output for an intermediate switch such as switch 52 are connected to the switch unit in the row above and in the row below or in this case the switch above the row is switch 72 and the switch below the row is switch 92.

Figure 4:
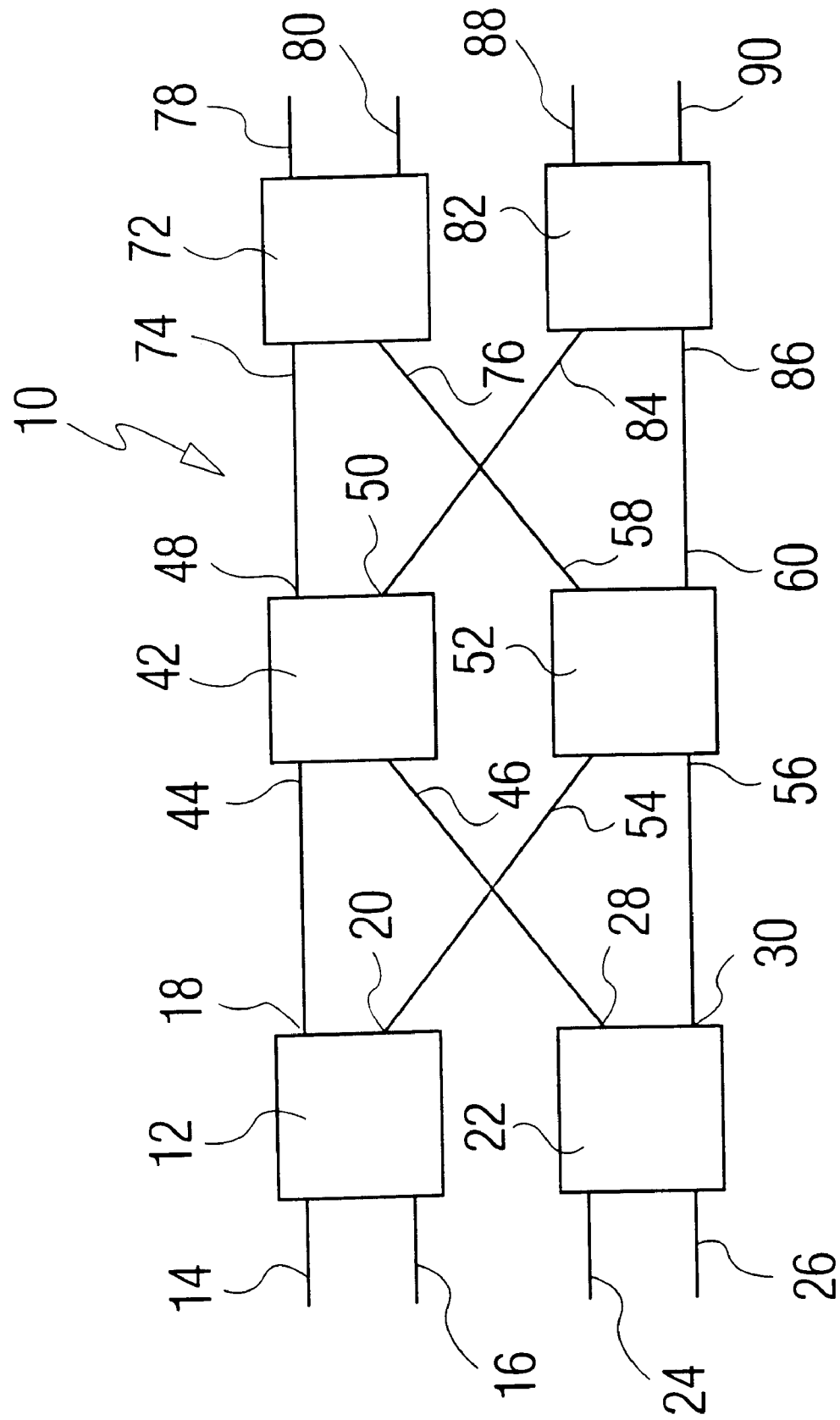
FIG. 4 is a view showing switch elements interconnected to form an expandable ATM multistage switch which is used according to the invention.

In the case of the combined multistage switch providing four inputs and four outputs as in FIG. 4, only first and last row switches are provided. The combined multistage switch follows the rule that each first or last row switch is connected to the next subsequent stage of the same row and one connection of the next subsequent stage of a different row and also the requirement that for each n rows, n+1 stages are provided. As additional rows are provided to provide additional input pairs, intermediate rows are provided. The combined multistage switch in such situations, as shown in FIG. 5, follows the rules as noted for the switch of FIG. 4 and additionally the intermediate switch elements of each stage are connected to two different switch elements of the subsequent stage, of different rows.

In FIG. 5 the multistage switch 10' includes stages I, II, III and IV as indicated above the various switch elements in each stage. Within the stage there is a first or topmost switch element T a bottommost switch element or last switch element B. Switch elements inbetween switch element T and B are intermediate switch elements labeled I. The multistage switch 10' shown in FIG. 5 has three rows of switch elements 112 and four stages. In FIG. 5 the rows are designated R1, R2 and R3 with R1 being the topmost or first row and R3 being the bottommost or last row. In a manner similar to that described in FIG. 4, the first switch or top switch of any given stage or the last switch or bottom switch (in the last row) of any given stage is connected to a switch unit of the subsequent stage which is in the same row and connected to a switch unit in the subsequent stage which is one row away from the same row (an adjacent row). The intermediate switches I (if any) are each connected to a switch unit of the next stage but in one row higher than the row it occupies and one row lower than it occupies. This basic system is preserved upon the addition of further stages and further rows of switches.

Figure 6:
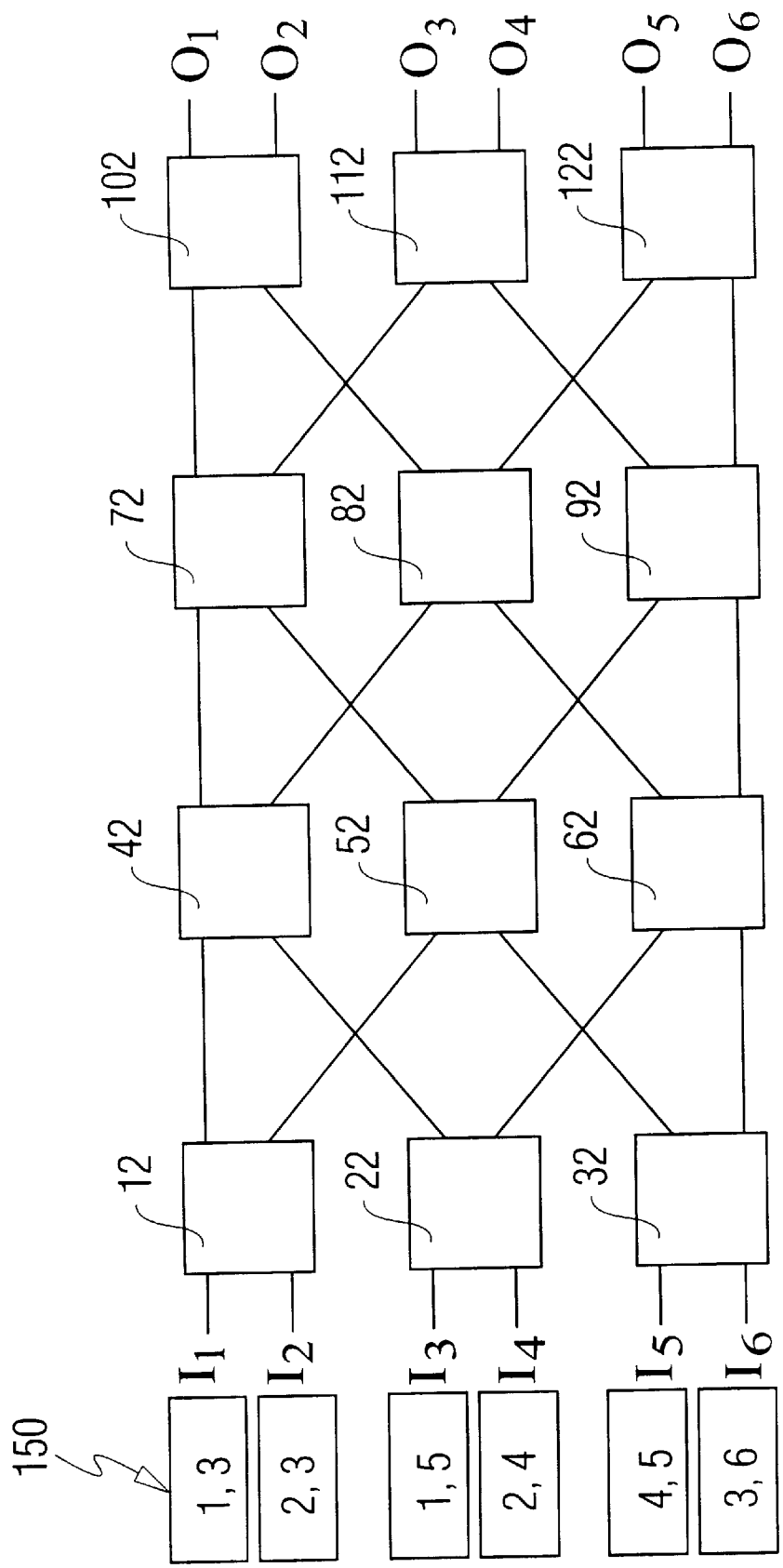
FIG. 6 is a view similar to FIG. 5 showing a first step of a request/grant cycle according to the invention.

FIG. 6 shows the multi stage switch 10 the with various inputs I1, I2, I3, I4, I5 and I6 corresponding to input/output devices 14, 16, 24, 26, 34 and 36 of switch elements 12, 22 and 32. The output stage of multi stage switch 10 includes outputs O1, O2, O3, O4, O5 and O6 which correspond to input/output devices 108, 110, 118, 120, 128 and 130 of switch elements 102, 112, 122.

The system and device of the invention includes queue means 150 which presents header line packet information (cell destination information) to the input elements of the switch elements. The queue means 150 can be several queues each presenting cells or header line packets. FIGS. 5 through 9 provide an example to explain the optimization features.

The queue means 150, connected to input I1 of switch 12 presents header line packets (cell address information), in this case with destinations (1, 3) for the first output O1 and the third output O3. The queue means 150 connected to input I2 includes data or cells with the destination address (2, 3) for output port O2 and output port O3. The queue means 150 connected to input I3 includes data or cells with the destination address (1, 5) for output port O1 and O5. The queue means 150 connected to input I4 includes data with the destination address (2, 4) for output port O2 and O4. The queue means 150 connected to the input I5 includes data with the destination address (4, 5) for output port O4 and O5. The queue means 150 connected to the input I6 is presented with header line packet information (3, 6) corresponding to output port O3 and O6.

Figure 7:
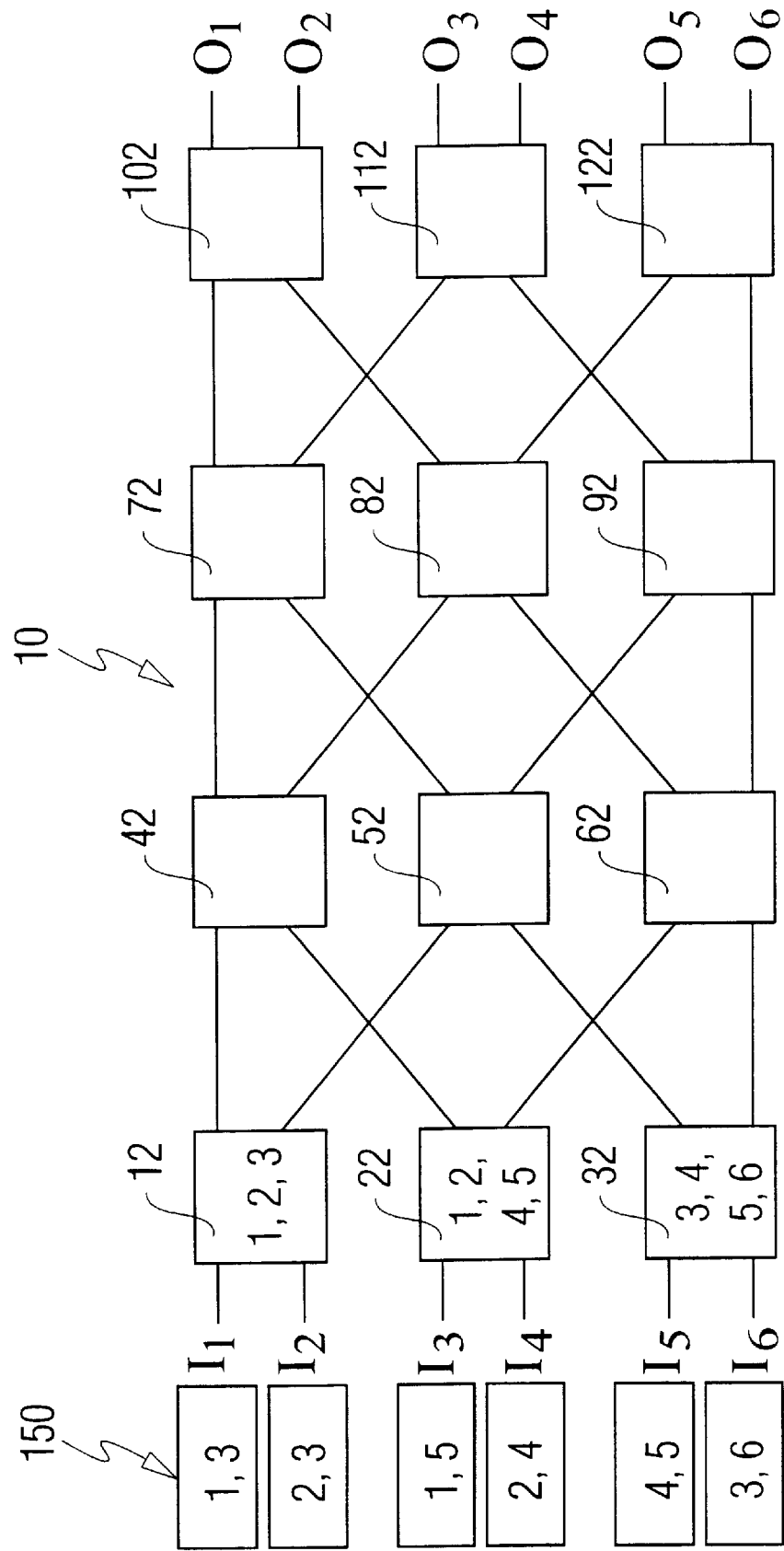
FIG. 7 is a view similar to FIG. 6 showing a further step in the request/grant cycle.

As illustrated in FIG. 7, each switch element of the input stage, namely switch elements 12, 22 and 32 constructs requests (bit map) for output ports. This is then broadcast into the switch fabric of multi stage switch 10.

At each stage, 12, 22, 32 (as the input stage), 42, 52, 62 (as the intermediate stage or intermediate stage) and 72, 82, 92 (as the third/output stage), the requests are remembered, merged and propagated. At switch element 12 of FIG. 7, the numbers 1, 2, 3 indicate that the requests have been merged and remembered, namely placed into memory. After merging the requests, requests 1, 3, 2, 3 become 1, 2, 3. Similarly, the switch element 12 shows the numbers 1, 2, 4, 5 (requests 1, 5 and 2, 4 become 1, 2, 4, 5 (no real merger here). In switch element 32, the numbers 3, 4, 5, 6 represent the memorized and merged requests, namely, 4, 5, 3, 6. The merged requests are then propagated to the next stage. This is shown in FIG. 7.

At switch element 42, the numbers 1, 2, 3, 4, 5 represent merged requests from switch elements 12 and 22 which have been stored and which have been merged and which are to be propagated to the next stage. Switch elements 52 and 62 show requests for all six output ports. These requests, after having been merged and memorized, are propagated to the next stage, namely switches 72, 82 and 92.

Figure 8:
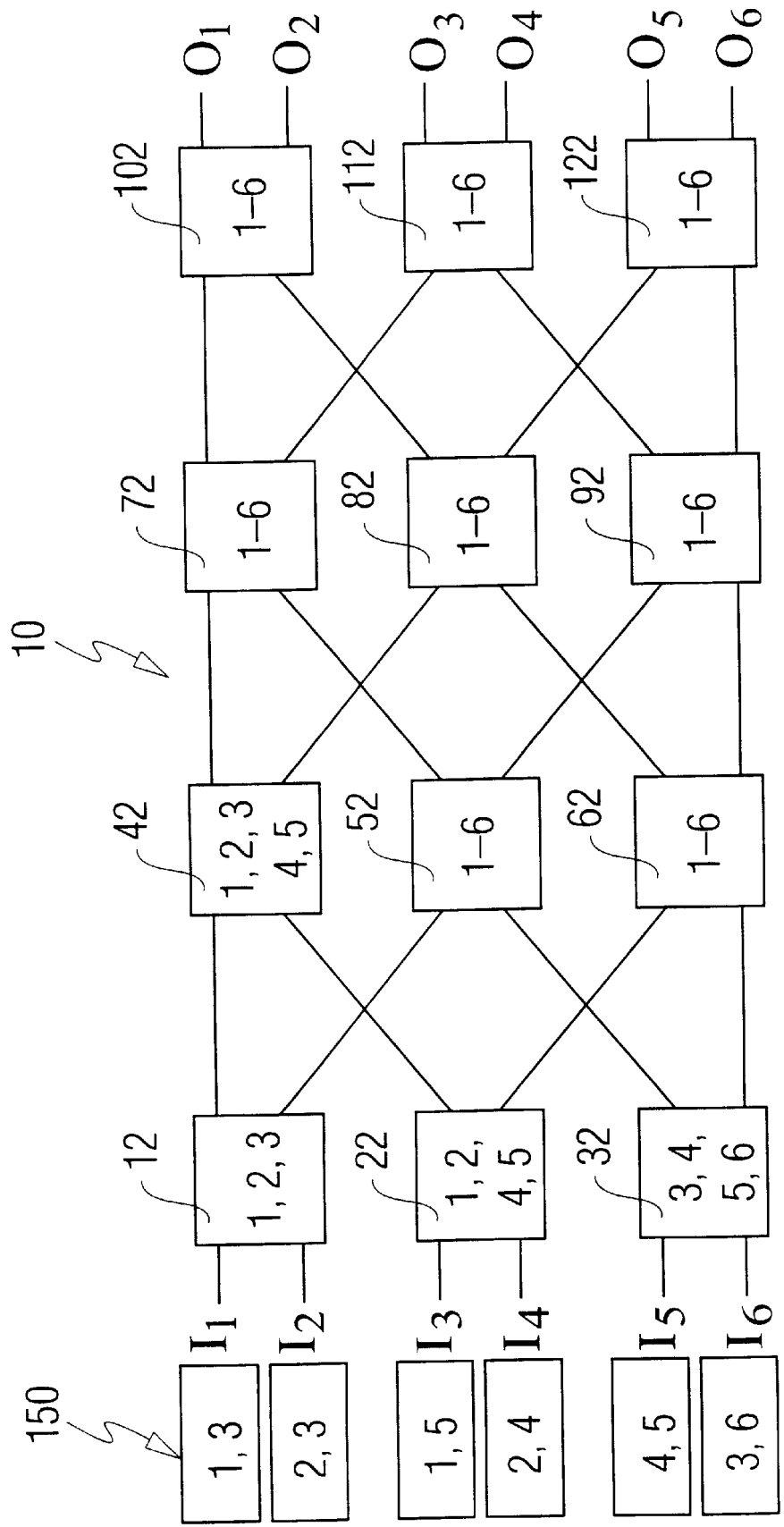
FIG. 8 is a view similar to FIG. 6 showing still a further step in the request/grant cycle.

The received requests which have been merged and remembered (stored) in the third stage are also shown in FIG. 8. The requests which have been merged and remembered (stored) in the final or output stage are also shown in FIG. 8. In this example, each of the switches presents a request for each of the ports at the final or output stage. Of course, other situations may occur, depending upon the requests presented by queue means 150.

Figure 9:
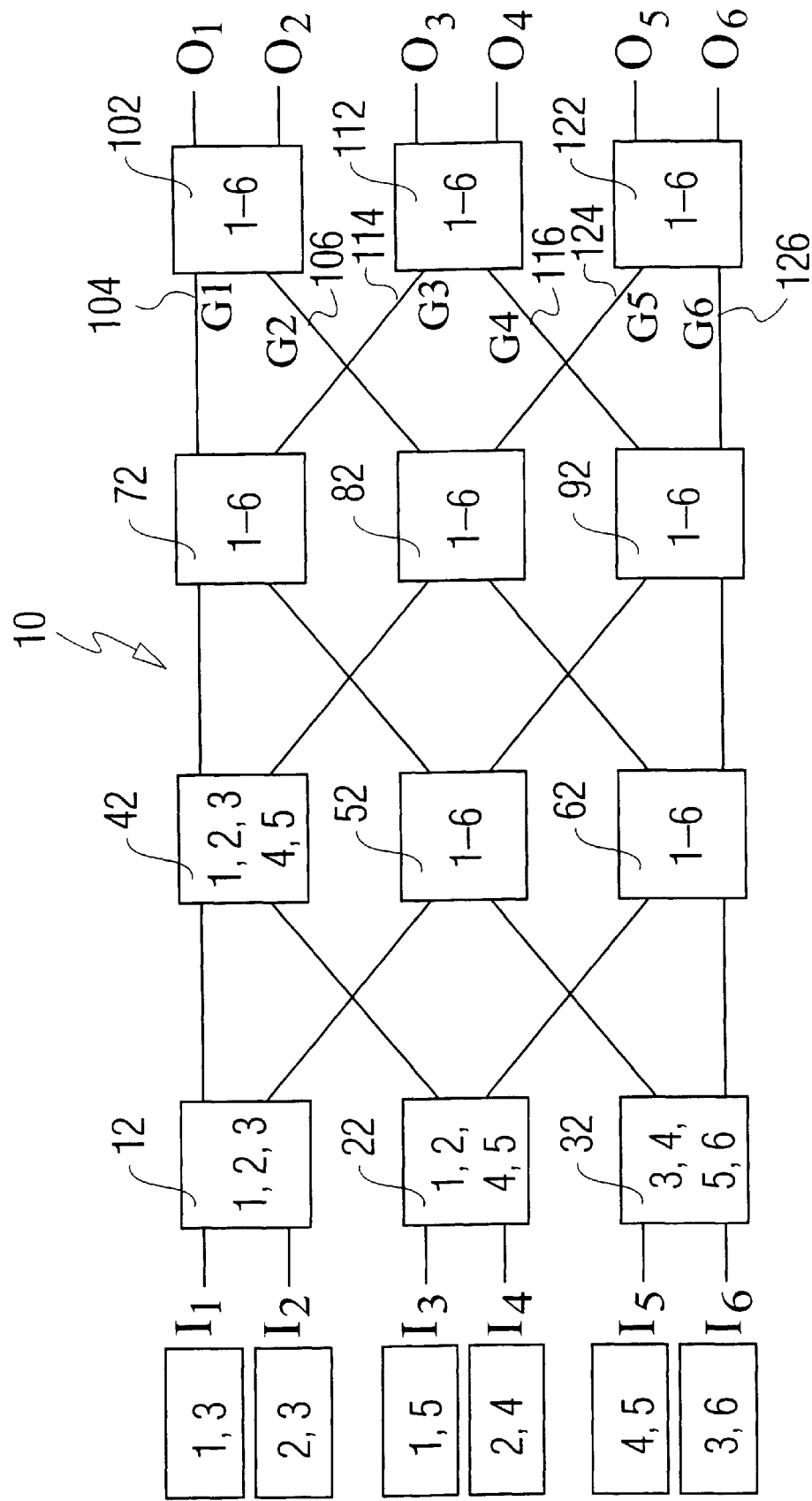
FIG. 9 is a view similar to FIG. 6 showing still a further step in the request/grant cycle.

Output ports O1, O2, O3, O4, O5 and O6 issue a grant for the port if they can accept traffic. The designation G1 at the uppermost port 104 of switch element 102 of FIG. 9, represents the propagation of the grant to port O1, from the switch element 102 to switch element 72. The designation G2 at the lowermost port 106 of switch element 102 represents the propagation of the grant to port O2 from the switch element 102 to the switch element 82. The grant of port O3 is sent as shown by G3 from switch element 112 to switch element 72. The grant for port O4 is sent from switch element 112 to switch element 92 as indicated by G4. The grant to port O5 is sent from switch element 122 to switch element 82 at G5. The grant for port O6 is sent from switch element 122 to switch element 82. Situations can occur wherein a port cannot accept traffic. Also, situations may occur wherein no requests are made for the port.

Figure 10:
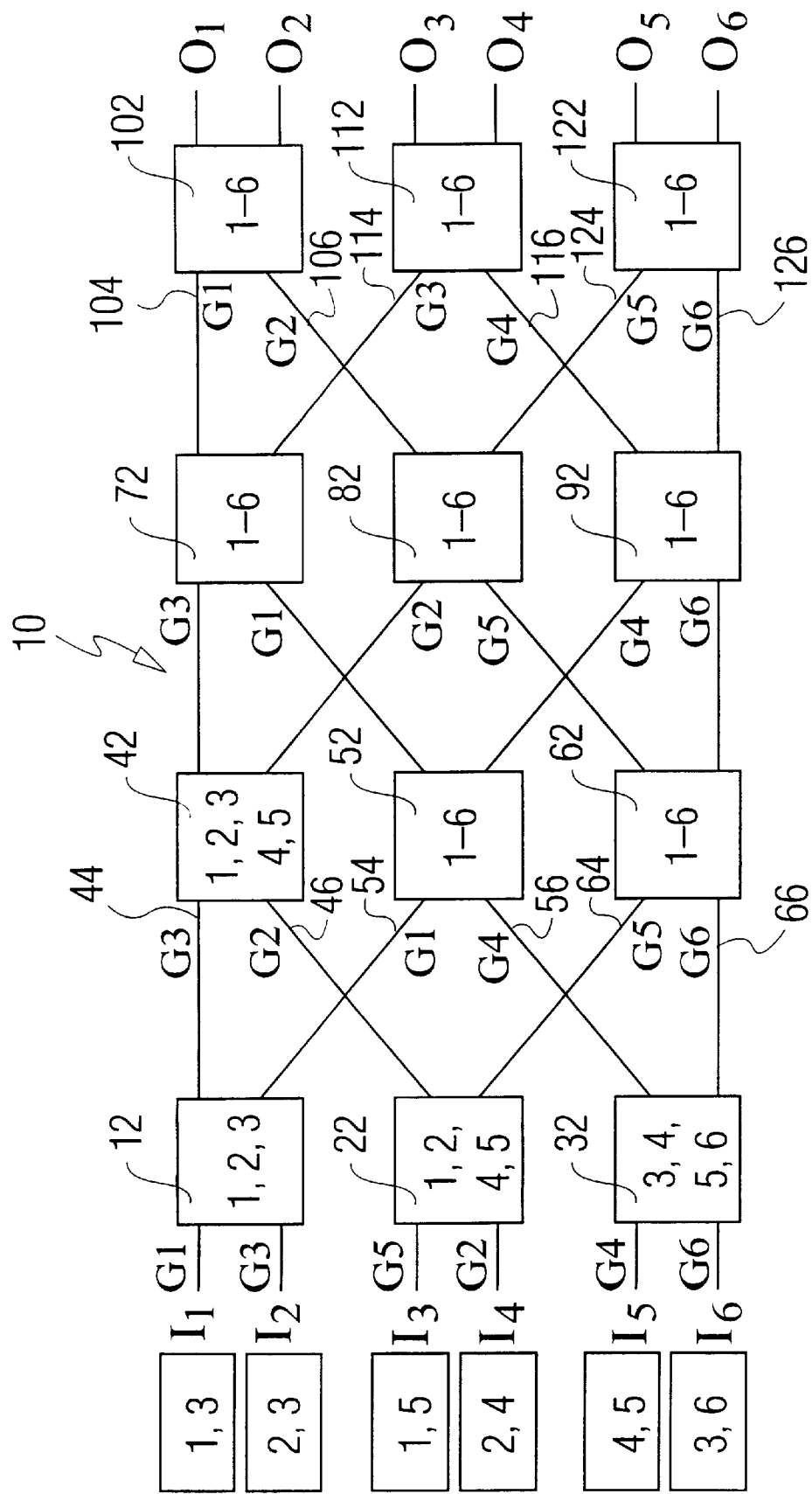
FIG. 10 is a view similar to FIG. 6 showing access grants provided to the inputs of the multistage switch.
Figure 11:
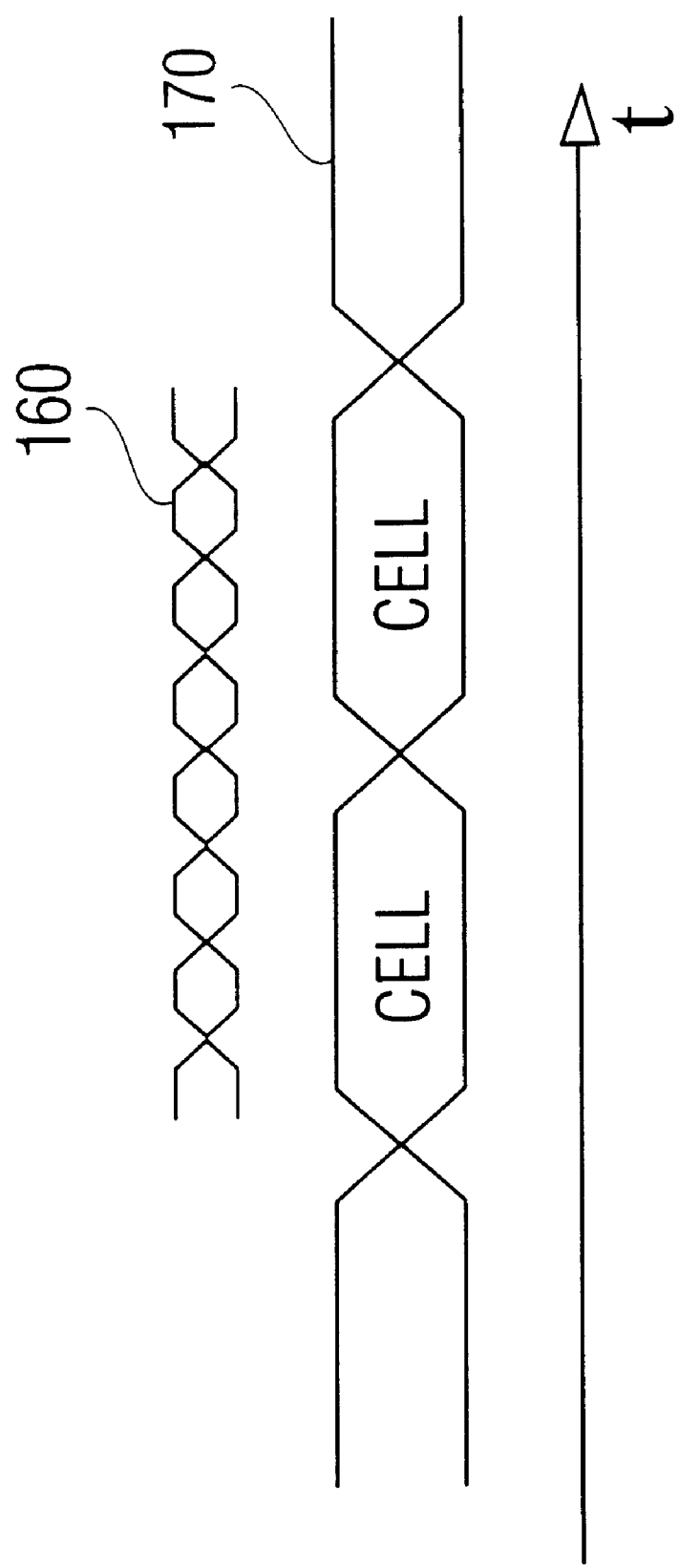
FIG. 11 is a view showing the request/grant cycle being three to four times the rate of the data flow.

FIG. 10 shows the further propagation of the grants from the output stage toward the input stage. At the intermediate stages, the grant is further propagated to the input that requested that port. If both inputs requested a port, a random choice is made to propagate the grant to an input. At switch element 62, each of input 64 and 66 have requested port O5. A random choice is then made. In the example shown, input 64 receives the grant G5 for port O1. As input 64 has requested grant G5, to port O5, grant G5 is propagated backwards via input 64. At switch element 52 grant G1 is sent to input 54 which has requested it. Grant G4 is sent on input 56 which has requested a grant for output 4. At switch element 42 grant G3 is propagated backward via input 44 and grant G2 is propagated backwards via input 46.

As can be appreciated from considering the example of FIG. 5, situations will occur when grants are not provided to an input, namely inputs I1, I2, I3, I4, O4, I5, I6. When this occurs, further grant cycles occur. The grant cycles are preferably set to occur with 3 to 4 request/grant cycles per cell flow. This is graphically shown in FIG. 11 where the axis labeled t is time and 160 indicates the grant cycle and 170 shows the cell flow.

If an input is given a grant, it transmits on the next time slot (and the path of the grant is the path of the data). In the example of FIG. 9, port I1 is given a grant for output O1. It then transmits on the next time slot. If an input is not given a grant, it retries. Several iterations of the request/grant cycles are possible for a single data cycle, resulting in a very high efficiency for the system of the multi stage switch of the invention.

While specific embodiments of the invention have been shown and described in detail to illustrate the application of the principles of the invention, it will be understood that the invention may be embodied otherwise without departing from such principles.

What is claimed is:

1. A multi stage asynchronous transfer mode switch system comprising:

switch elements with inputs switchable to outputs, said switch elements defining a matrix with an input stage, an output stage and at least one intermediate stage, each stage including a first switch element in a first row and a last switch element in a last row;

means for presenting the multi stage switch inputs with address information for data, the address information indicating requests for one of several outputs of the multi stage switch;

means for broadcasting the address information into the multi stage switch;

memory means at each stage for remembering the received requests, merging the received requests and propagating the received requests to connected switching elements of a next stage;

request grant means at each output of the multi stage switch, granting a request if traffic can be accepted and propagating the request grant to connected switching elements;

means at each switching element, upon receiving the request grant, for propagating the request grant to an input that requested the granted output port, wherein if more than one of said inputs requested the granted port, choosing one of said inputs and propagating the grant on the randomly chosen said one of said inputs; and transmitting means for, upon receiving a request grant at the input of the multi stage switch, transmitting data on a next time slot.

2. The system according to claim 1, wherein inputs of the multi stage switch which do not receive a request grant, retry several iterations of the request/grant cycle until a grant is received.

3. A multi stage asynchronous transfer mode switch, comprising:

switch elements with input elements switchable to output elements, said switch elements being arranged to define a switch fabric with an input stage and an output stage;

connections between some of said switch elements;

queue means for presenting destination information to the input stage of the multi stage switch;

request means for forming a request map based on presentation information provided by said queue means at each input of the multi stage switch;

memory means associated with each switch element of the multi stage switch;

merging means for merging received requests;

propagating means for propagating merged requests from one stage to another;

grant means for issuing grants to requests received at outputs of said output stage and propagating said grants back to said input stage.

4. A switch according to claim 3, wherein said switch elements are further arranged as at least one intermediate stage connecting said input stage to said output stage and said switch further comprising:

random selection means wherein at each of said switch elements, grants are propagated to one input/output element of each switch element depending upon which input has requested a port associated with the received grant, and wherein if more than one of the input elements requested the granted port, said random selection means randomly selects one of the input elements.

5. A switch according to claim 4, wherein inputs of the multi stage switch which do not receive a request grant, retry several iterations of the request/grant cycle until a grant is received.

6. A switch according to claim 4, wherein said connections comprise:

a connection from a first switch element of said input stage to a first switch element of said intermediate stage;

a connection from said input stage first switch element to a switch element of said intermediate stage in a different row;

a connection from a last switch element of said input stage to a last switch element of said intermediate stage; and a connection from a last switch element of said input stage to a switch element of said intermediate stage in a different row.

7. A switch according to claim 6, wherein additional connections are provided between switch elements of said intermediate stage and said output stage, wherein first and last switch elements include a connection to a corresponding first and last switch elements of another stage and a connection to an intermediate switch element of another stage which occupies an immediately adjacent row.

8. A switch according to claim 6, further comprising one or more intermediate switch elements in one or more intermediate rows, wherein said additional connections include connections provided between intermediate switch elements and other switch elements, each intermediate switch element of a stage being connected to a switch element of an adjacent stage, said switch element of said adjacent stage being in a different row from said intermediate switch element.

9. A switch according to claim 6, wherein the switch is bi-directional with each input element being an input/output and each output element being and input/output.

10. A process for transferring data over a multi stage asynchronous transfer mode switch the process comprising the steps of:

providing switch elements with inputs switchable to outputs, said switch elements defining a matrix with an input stage and an output stage;
 presenting the multi stage switch inputs with address information for data, the address information indicating requests for one of several outputs of said the multi stage switch;
 broadcasting the address information into the multi stage switch;
 at each switch element, remembering the received requests, merging the received requests and propagating the received request to connected switching elements of a next stage;
 at each output of the multi stage switch, granting a request if traffic can be accepted and propagating the request grant to connected switching elements;
 at each switching element, upon receiving the request grant, propagating the request grant to an input that requested the granted output port; and
 upon receiving a request grant at the input of the multi stage switch, transmitting data on a next time slot.

11. A process according to claim 10, wherein inputs of the multi stage switch which do not receive a request grant, retry several iterations of the request/grant cycle until a grant is received.

12. A process for connecting individual switching elements to provide a multistage asynchronous transfer mode switch the process comprising the steps of:

providing a plurality of switching elements with at least two inputs each switchable to one of at least two outputs;
 arranging said plurality of switching elements for connection to provide an input stage of switching elements, at least one intermediate stage and an output stage of switching elements;
 connecting an output of a first switching element of said input stage to an input of a first switching element of said at least one intermediate stage;
 connecting another output of said first switching element of said input stage to an input of a switching element of said at least one intermediate stage in a different row from a row of said first switching element of said input stage;
 connecting an output of a last switching element of said input stage to an input of a last switching element of said at least one intermediate stage;
 connecting another output of said last switching element of said input stage to an input of a switching element of said at least one intermediate stage in a different row from a row of said last switching element of said input stage;
 providing said at least one intermediate stage of switching elements and additional connections between said switching elements such that each input stage switch has outputs connected to two different intermediate stage switching elements and each intermediate stage switching element has outputs connected to two different further switching elements, either from a further intermediate stage or from said output stage
 presenting the multi stage switch inputs with address information for data, the address information indicating requests for one of several outputs of said the multi stage switch;
 broadcasting the address information into the multi stage switch;
 at each stage, remembering the received requests, merging the received requests and propagating the received request to connected switching elements of a next stage;
 at each output of the multi stage switch, granting a request if traffic can be accepted and propagating the request grant to connected switching elements;
 at each switching element, upon receiving the request grant, propagating the request grant to an input that requested the granted output port, wherein if more than one of the inputs requested the granted port, randomly choosing one of the inputs and propagating the grant on the randomly chosen input; and
 upon receiving a request grant at the input of the multi stage switch, transmitting data on a next time slot.

13. A process according to claim 12, wherein inputs of the multi stage switch which do not receive a request grant, retry several iterations of the request/grant cycle until a grant is received.

14. A system for connecting individual switching units to provide a multi stage asynchronous transfer mode switch, the system comprising:

switch elements with input/outputs switchable to other input/outputs, said switch elements defining a switch fabric matrix with an input stage, an output stage and at least one intermediate stage, each stage including a first switch element in a first row, a last switch element in a last row;
 a connection from said input stage first switch element to said intermediate stage first switch element;
 a connection from said input stage first switch element to a switch element of said intermediate stage in a different row;
 a connection from said input stage last switch element to said intermediate stage last switch element;
 a connection from said input stage last switch element to a switch element of said intermediate stage in a different row;
 additional connections between switch elements;
 queue means for presenting data destination information to the input stage of the multi stage switch;
 request means for forming a request map based on information provided by said queue means at each input of the multi stage switch;
 memory means associated with each switch element of the multi stage switch;
 merging means for merging received requests at each switch element;
 propagating means for propagating merged requests from one stage to another; and
 grant means for issuing grants to requests received at outputs of said output stage and propagating said grants back to said input stage.

15. A system according to claim 14, further comprising random selection means wherein at each stage, grants are propagated to one of two input/output elements of each individual switch element depending upon which of said two input/output elements has requested a port associated with the received grant, and wherein if each of said two input/output elements requested the granted port, said random selection means randomly selects one of one of said two input/output elements.

16. A process according to claim 12, further comprising: providing random selection wherein at each stage, grants are propagated to one of two input/output elements of each individual switch element depending upon which of said two input/output elements has requested a port associated with the received grant, and wherein if each of said two input/output elements requested the granted port, said random selection means randomly selects one of said two input/output elements.

* * * * *